United States Patent [19]

Carr et al.

[11] Patent Number: 5,230,361
[45] Date of Patent: Jul. 27, 1993

[54] SNAP ACTION TOGGLE VALVE ACTUATOR ASSEMBLY

[75] Inventors: Thomas W. Carr, Easton; Daniel Douro, Allentown, both of Pa.

[73] Assignee: Spirax Sarco, Inc., Allentown, Pa.

[21] Appl. No.: 977,609

[22] Filed: Nov. 17, 1992

[51] Int. Cl.$^5$ .................... F16K 31/26; F16K 31/56
[52] U.S. Cl. .................... 137/416; 74/100.1; 74/520; 137/418; 137/445; 251/75; 251/280
[58] Field of Search .............. 137/416, 418, 445; 74/100.1, 100.2, 520; 251/75, 280

[56] References Cited

U.S. PATENT DOCUMENTS

| | | | |
|---|---|---|---|
| 606,404 | 6/1898 | Burnett | 137/445 |
| 802,330 | 10/1905 | Schulze | 137/445 |
| 1,175,695 | 3/1916 | Brand | 251/75 |
| 1,181,716 | 5/1916 | Allgeyer | 251/75 |
| 1,314,243 | 8/1919 | Brand | 251/75 |
| 1,314,244 | 8/1919 | Brand | 251/75 |
| 1,395,551 | 11/1921 | Brand | 251/75 |
| 1,427,116 | 8/1922 | Moligue | 137/445 |
| 1,493,640 | 5/1924 | Nachbaur | 137/418 |
| 1,864,158 | 6/1932 | Weinrich et al. | 74/100.1 |
| 2,493,474 | 1/1950 | Breese | 158/38 |
| 2,606,543 | 8/1952 | Rappl | 123/136 |
| 2,882,744 | 4/1959 | Keller | 74/520 |
| 2,957,358 | 10/1960 | Anderson | 74/97 |
| 3,091,253 | 5/1963 | Austin | 137/461 |
| 3,144,043 | 8/1964 | Arnold | 137/104 |
| 3,208,467 | 9/1965 | Eichelman | 137/104 |
| 3,324,878 | 6/1967 | Dill | 137/418 |
| 3,402,614 | 9/1968 | Malette | 74/100 |
| 3,517,908 | 6/1970 | Nowak | 251/158 |
| 3,731,555 | 5/1973 | Fressmann | 74/491 |
| 3,771,760 | 11/1973 | Sheldon | 74/491 |
| 4,535,817 | 8/1985 | Steiger | 137/625 |
| 4,595,032 | 6/1986 | Banks | 15/3 |

FOREIGN PATENT DOCUMENTS 888137 12/1943 France .................... 137/418

Primary Examiner—George L. Walton
Attorney, Agent, or Firm—Eckert Seamans Cherin & Mellott

[57] ABSTRACT

A snap action toggle valve actuator assembly for use in a fluid holding tank. Movement of a float or other movable actuating element causes pivotal movement of pivot arm, which compresses a spring. When the float element reaches a predetermined level, the spring causes a downward movement in linkage attached to the rear of a valve actuating lever and an upward movement of a valve rod secured to the other end of the valve actuating lever and vice versa.

10 Claims, 4 Drawing Sheets

SNAP ACTION TOGGLE VALVE ACTUATOR ASSEMBLY

BACKGROUND OF THE INVENTION

This invention relates to a valve actuator assembly used to control the flow of steam, compressed air or other fluids under pressure. It relates particularly to a snap action toggle float valve assembly used to control a pressure powered steam condensate pump.

Float valve assemblies have been used for many years to operate either an inlet or an outlet valve in a fluid holding tank. The operating valve is either opened or closed in response to a rise of the fluid to a predetermined level in the fluid holding tank. One well known example of a float valve assembly is used to control the flow of water to refill a toilet tank.

Most float valve assemblies are designed to open or close the valve gradually as the level of the fluid in the fluid holding tank raises or lowers. Such a float valve assembly not only slows down the filling or discharge of the fluid in the fluid holding tank bu often causes premature wear to the valve or the valve seat due to the relatively long interval of fluid flow through the valve.

SUMMARY OF THE INVENTION

It is therefore an object of this invention to provide a valve actuator assembly that provides a quick, positive movement of the valve when the level of the fluid in the fluid holding tank reaches a predetermined level.

It is a further object of this invention to provide a valve actuator assembly that is able to operate easily and reliably in a fluid holding tank subject to high pressures and temperatures.

It is a still further object of this invention to provide a valve actuator assembly that is easily manufactured and can be adapted to many types of equipment that are controlled by float valves.

These and other objects of this invention will become apparent from the accompanying specification, drawings and claims.

DESCRIPTION OF PREFERRED EMBODIMENT

Figure 1:
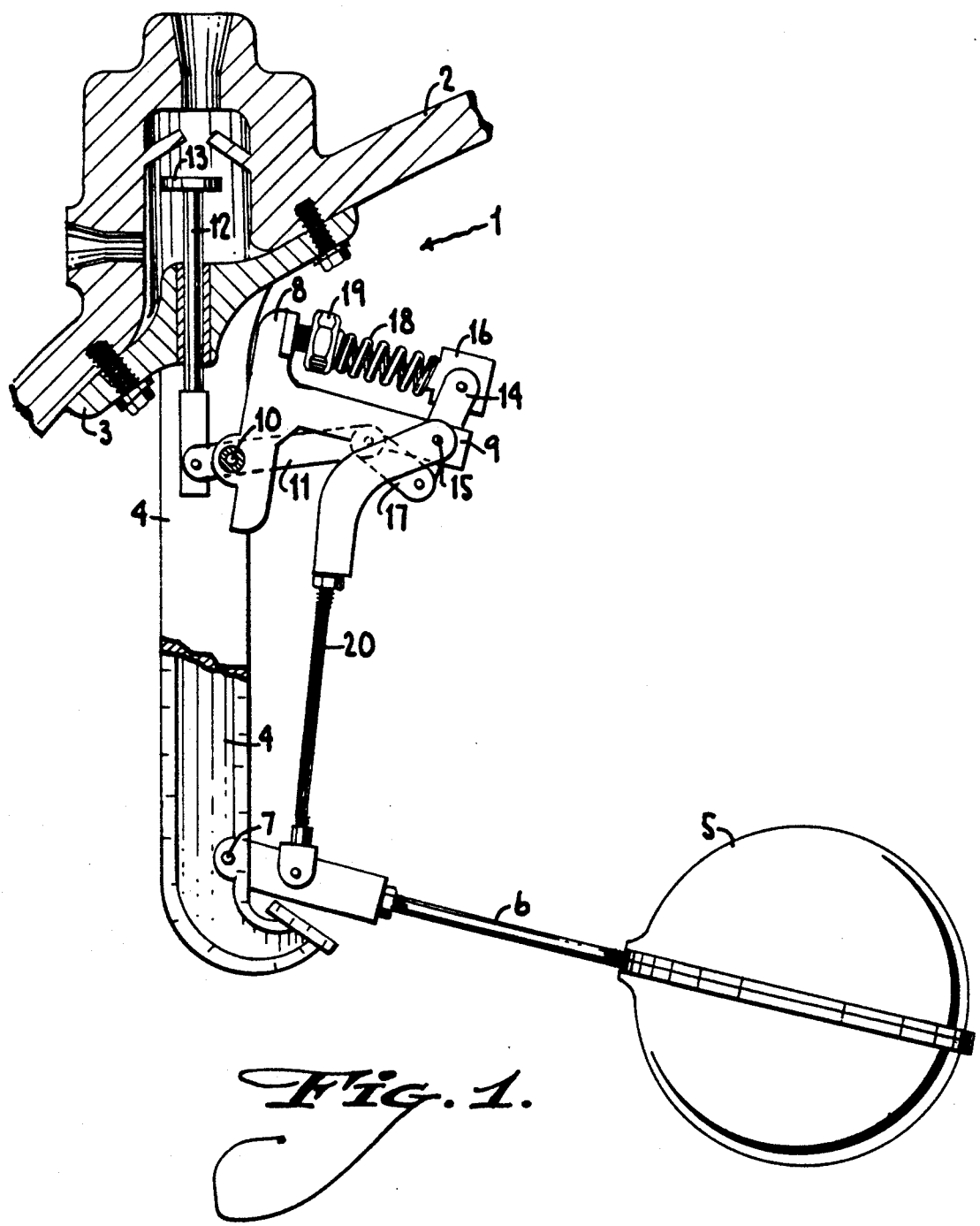
FIG. 1 is an elevational view, partly in section, of a preferred embodiment of the float valve assembly of this invention where the fluid control valve is in an open position to allow the flow of fluid through the valve.
Figure 2:
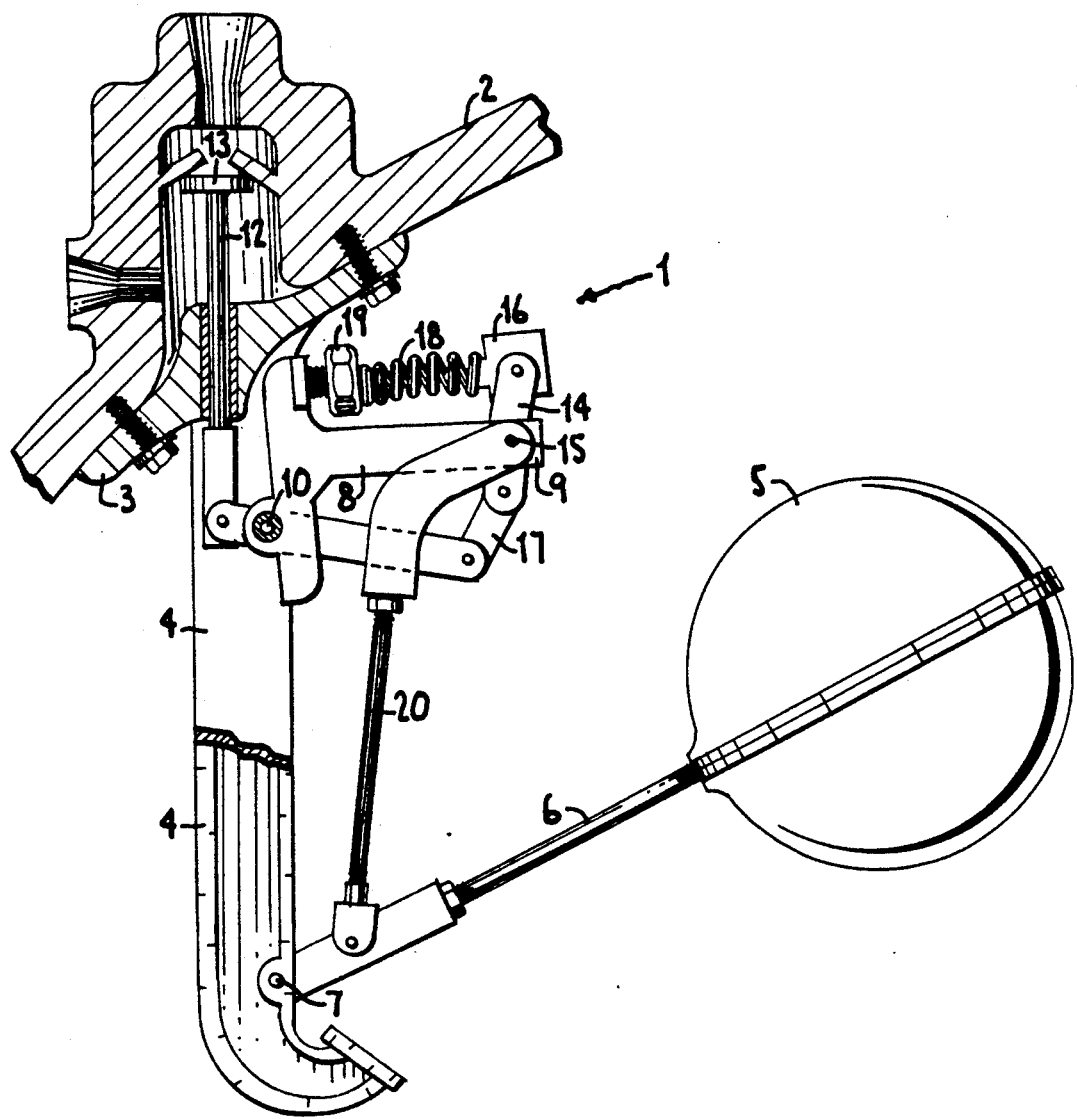
FIG. 2 is an elevational view, partly in section, of a preferred embodiment of the float valve assembly of this invention where the fluid control valve is in a closed position to prevent the flow of fluid through the valve.

Illustrated in FIGS. 1 and 2, is a preferred embodiment of the valve actuator assembly 1 of this invention used in connection with a float and fluid holding tank 2.

Figure 3:
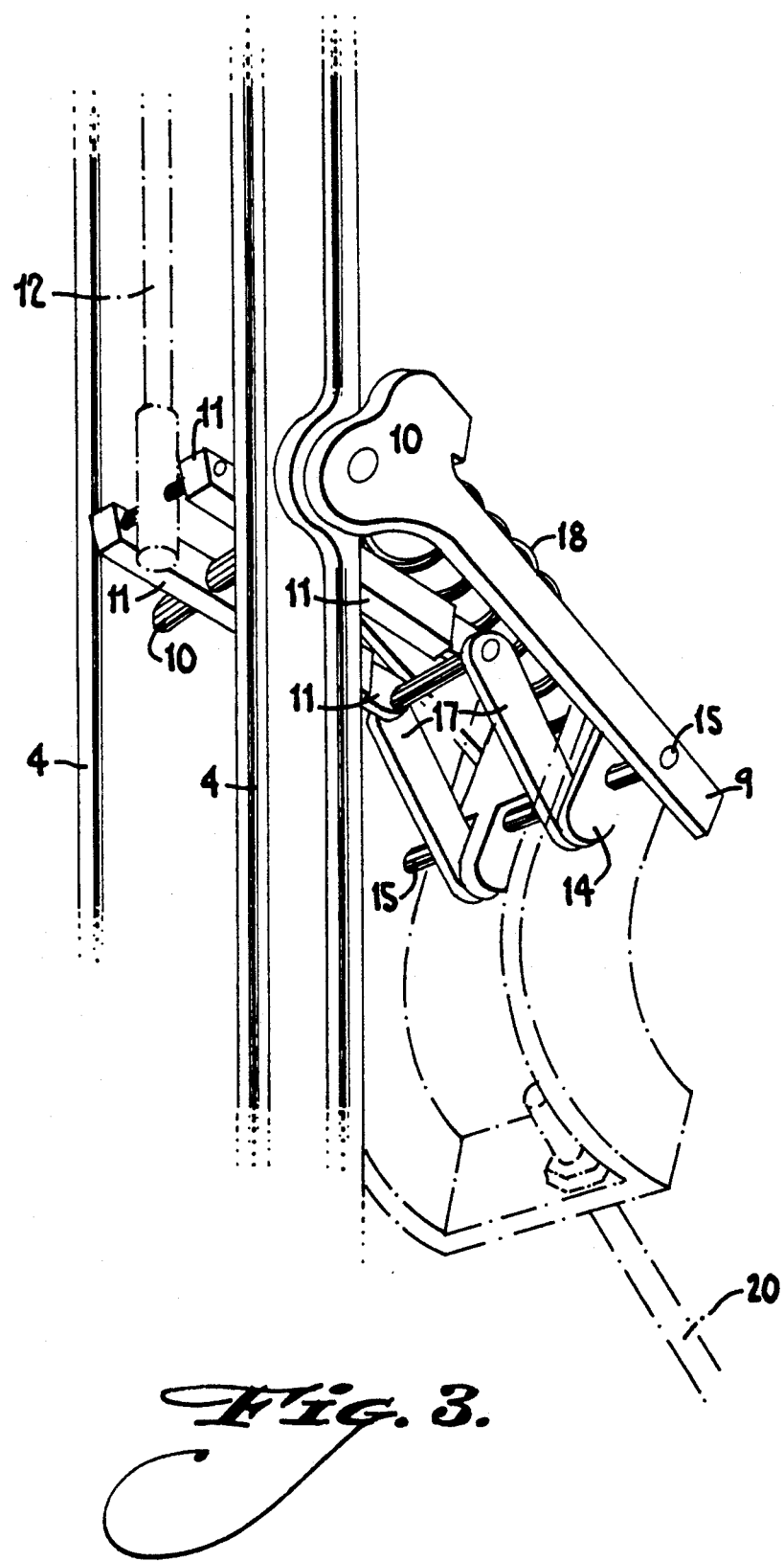
FIG. 3 is a partial end view to illustrate a portion of the float valve assembly of a preferred embodiment of this invention.

As shown in FIGS. 1, 2, and 3, support means 3 in the form of an elongated arm having a pair or spaced, substantially parallel sides 4 is secured to the underside of the top of the tank 2 so that the support means 3 is rigidly suspended from a wall of tank 2 and extends downwardly towards the bottom of the tank. The valve actuator assembly could also be mounted in other arrangements in order to fit other pieces of valve operated equipment.

As shown in FIGS. 1 and 2, a float element 5 is secured to the end of a float arm 6 which is pivotally connected to a lower bearing pin 7 which extends between both sides 4 of the support means 3. A substantially U-shaped yoke member 8 having a base 9 and spaced and substantially parallel sides is pivotally connected to an upper bearing pin 10 which extends between both sides 4 of the support means 3 which is more clearly shown in the end view illustrated by FIG. 3.

A valve actuating lever 11 is also positioned between the sides 4 or the support means 3 and is pivotally connected to the upper bearing pin 10 also. One end of the valve actuating lever 11 is attached to a valve rod 12 used to open and close the valve 13. A pivot arm 14 is pivotally connected to the sides of the U-shaped yoke member 8 by a pivot arm bearing pin 15 extending through the sides of the U-shaped yoke member 8 adjacent to the base 9.

A first spring retainer 16 is pivotally connected one end of the pivot arm 14 and a link 17 or pair of spaced parallel link elements is pivotally connected to the other end of the pivot arm 14 and to one end of the valve actuating lever 11. A compression spring 18 is mounted between the first spring retainer 16 and a second spring retainer 19 secured to the U-shaped yoke member 8. The second spring retainer 19 is preferably adjustable to adjust the compressive force on the compression spring 18.

As shown in FIGS. 1 and 2, a toggle actuation arm 20 has one end thereof pivotally connected to the float arm 6 between the float element 5 and the lower bearing pin 7, and the other end of the toggle actuation arm 20 is connected to the pivot arm bearing pin 15 on the U-shaped yoke member 8.

FIG. 1 illustrates the float valve assembly of this invention in a fluid holding tank 2, such as may be incorporated with a pump, where the level of the fluid in the tank is low and the float element 5 is in a down position. In this example, when the float element 5 is in a down position the valve 13 is open.

FIG. 2 illustrates the float valve assembly of this invention in a fluid holding tank 2, such as may be incorporated with a pump, where the level of the fluid in the tank is high and the float element 5 is in an up position. In this example, when the float element 5 is in a an up position the valve 13 is closed.

The pivoted connections between the various components of the valve actuator assembly of this invention provide a smooth, trouble free operation even under severe conditions and high tank pressures and temperatures. The valve actuator assembly of this invention provides for a quick, snap action to the valve actuating lever 11 and to the valve rod 12 itself and produces a quick, positive opening or closing of the valve 13 itself.

Figure 4:
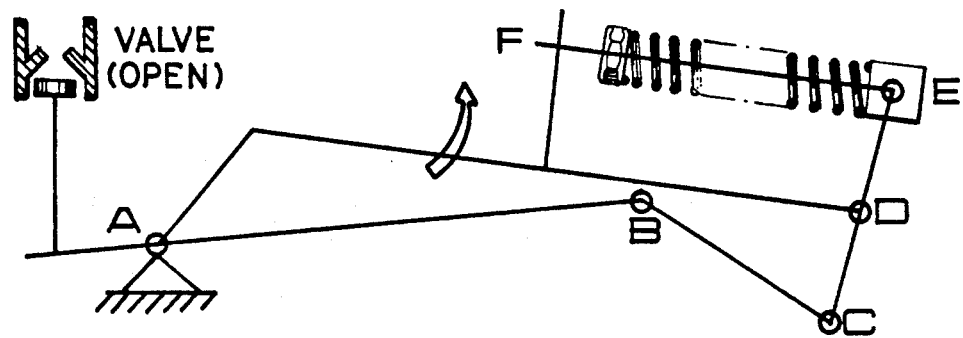
FIG. 4 is a schematic diagram to illustrate the relationship and interaction of the components of the valve actuator assembly of this invention where the fluid control valve is in an open position.
Figure 5:
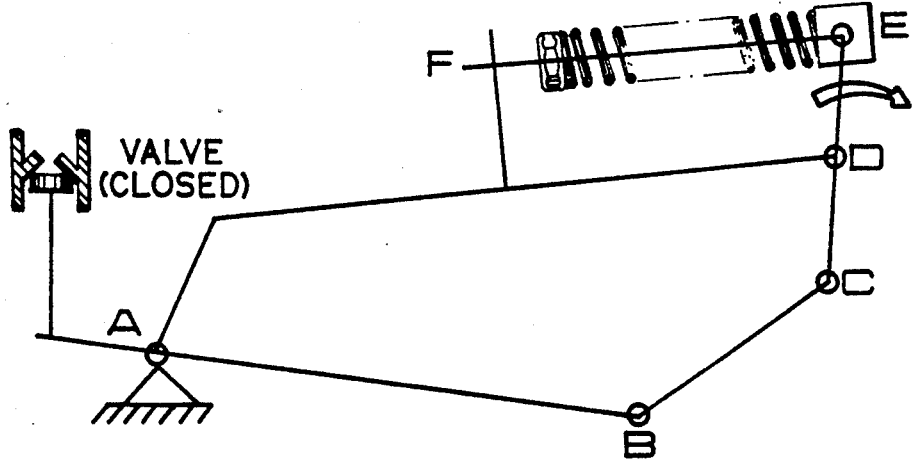
FIG. 5 is a schematic diagram to illustrate the relationship and interaction of the components of the valve actuator assembly of this invention where the fluid control valve is in a closed position.

This quick, positive snap action is the result of the interaction of the various components of the valve actuator assembly 1 that can be further illustrated by FIGS. 4 and 5.

FIG. 4 is a schematic diagram to illustrate the valve actuator assembly 1 shown in FIG. 1 where the float element 5 is down and the valve 13 is open. Element AB is the valve actuating lever 11, element BC is the link or links 17, element CE is the pivot arm 14, and element AD is the U-shaped yoke member 8. The compression spring 18 and its end retainers 16 and 19 are shown as element EF. As the float 5 rises it produces an upward movement in the toggle arm 20 and the U-shaped yoke member 8 and causes the pivot arm 14 to compress the spring 18. Further upward movement will cause the link or links 17 (Element BC) to become axially aligned with the valve actuating lever 11 (Element AB). Any further upward movement of the U-shaped yoke member 8 by toggle arm 20 allows the compression spring 18 (Element EF) to expand and thereby force the back end of the valve actuating lever 11 and the link or links 17 downwardly as shown in FIG. 5 causing an upward movement in the valve rod 12 and a closing of the valve 13. It will also be apparent to one skilled in this art that the valve actuator assembly of this invention will operate equally well in a reverse direction such as when the float Element J moves from an up position to a down position, and can be used to operate a plurality of valves instead of the single valve shown in the preferred embodiment.

While I have illustrated one preferred embodiment of this invention it is understood that the valve actuator assembly of this invention can be adapted to a number of different situations where a quick, positive snap movement of the valve is needed or required.

What is claimed is:

1. A snap action toggle actuator assembly comprising:
   (a) support means having a pair of spaced and substantially parallel sides and having an upper bearing pin and a lower bearing pin attached to the sides of said support means,
   (b) an actuator element pivotally connected to said lower bearing pin,
   (c) a substantially U-shaped yoke member having an intermediate radial extending base element and spaced and substantially parallel sides thereon pivotally connected to said upper bearing pin adjacent one end of said parrallel sides,
   (d) a valve actuating lever having one end pivotally connected to said upper bearing pin and said one end of said actuating lever being also attached to one end of a valve rod,
   (e) a pivot arm pivotally connected to the sides of said U-shaped yoke member by a pivot arm bearing pin attached to one end of the base element thereof,
   (f) a first spring retainer pivotally connected to one end of said pivot arm and a link having one end pivotally connected to the other end of said pivot arm and to the other end of said link being connected one end of said valve actuating lever,
   (g) a compression spring mounted between said first spring retainer and a second spring retainer secured to said U-shaped yoke member at the other end of said parallel sides, and
   (h) a toggle actuation arm having one end thereof pivotally connected to said actuator element, adjacent said lower bearing pin and the other end thereof pivotally connected to said pivot arm bearing pin whereby a quick and positive opening and closing movement of the valve rod is achieved.

2. The snap action toggle valve actuator assembly of claim 1 in which at least one of the spring retainers is provided with means to adjust the compressive force of the spring.

3. The snap action toggle valve assembly of claim 1 in which the link comprises a pair of spaced, parallel link elements.

4. The snap action toggle valve assembly of claim 1 in which a valve element is attached to the other end of the valve rod.

5. The snap action toggle valve assembly of claim 1 in which the valve element is used to control a pump.

6. A snap action toggle float valve assembly comprising:
   (a) support means having a pair of spaced and substantially parallel sides and having an upper bearing pin and a lower bearing pin attached to the sides of said support means,
   (b) a float element secured to a float arm pivotally connected to said lower bearing pin,
   (c) a substantially U-shaped yoke member having an intermediate radial extending base element and spaced and substantially parallel sides thereon pivotally connected to said upper bearing pin adjacent one end of said parallel sides,
   (d) a valve actuating lever having one end pivotally connected to said upper bearing pin and said one end of said actuating lever being also attached to one end of a valve rod,
   (e) a pivot arm pivotally connected to the sides of said U-shaped yoke member by a pivot arm bearing pin attached to one end of to the base element thereof,
   (f) a first spring retainer pivotally connected to one end of said pivot arm and a link having one end pivotally connected to the other end of said pivot arm and the other end of said link being connected to one end of said valve actuating lever,
   (g) a compression spring mounted between said first spring retainer and a second spring retainer secured to said U-shaped yoke member at the other end of said parallel sides,
   (h) a toggle actuation arm having one end thereof pivotally connected to said float arm between said float element and said lower bearing pin and the other end thereof pivotally connected to said pivot arm bearing pin, whereby a quick and positive opening and closing movement of the valve rod is achieved.

7. The snap action toggle float valve assembly of claim 6 in which at least one of the spring retainers is provided with means to adjust the compressive force of the spring.

8. The snap action toggle valve assembly of claim 6 in which the link comprises a pair of spaced, parallel link elements.

9. The snap action toggle valve assembly of claim 6 in which a valve element is attached to the other end of the valve rod.

10. The snap action toggle valve assembly of claim 6 in which the valve element is used to control a pump.

* * * * *

UNITED STATES PATENT AND TRADEMARK OFFICE
CERTIFICATE OF CORRECTION

PATENT NO. : 5,230,361
DATED : July 27, 1993
INVENTOR(S) : Thomas W. Carr, et. al.

It is certified that error appears in the above-indentified patent and that said Letters Patent is hereby corrected as shown below:

Column 3, Claim 1, line 56, after the word "and", delete the word "to".

Column 3, Claim 1, line 57, after the word "connected", insert the word --to--.

Column 4, Claim 6, line 35, after the word "of", delete the word "to".

Signed and Sealed this

Fifteenth Day of March, 1994

*Attest:*

BRUCE LEHMAN

*Attesting Officer*  *Commissioner of Patents and Trademarks*